(12) United States Patent
Weir et al.

(10) Patent No.: US 9,330,136 B2
(45) Date of Patent: May 3, 2016

(54) SYSTEM FOR PROVING PROACTIVE ZONE INFORMATION

(71) Applicant: TOYOTA JIDOSHA KABUSHIKI KAISHA, Toyota-shi, Aichi-ken (JP)

(72) Inventors: David Frank Russell Weir, San Jose, CA (US); Vinuth Rai, San Jose, CA (US); Divya Sai Toopran, Sunnyvale, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 298 days.

(21) Appl. No.: 14/049,162

(22) Filed: Oct. 8, 2013

(65) Prior Publication Data

US 2015/0100567 A1    Apr. 9, 2015

(51) Int. Cl.
 G06F 17/30 (2006.01)
 G01C 21/32 (2006.01)
 G01C 21/36 (2006.01)

(52) U.S. Cl.
 CPC .......... G06F 17/30424 (2013.01); G01C 21/32 (2013.01); G01C 21/3679 (2013.01)

(58) Field of Classification Search
 CPC ................................................ G06F 17/30424
 USPC .......................................................... 707/722
 See application file for complete search history.

(56) References Cited

U.S. PATENT DOCUMENTS

| 7,386,373 | B1 * | 6/2008 | Chen ...................... G01C 5/005 340/961 |
| 2006/0167632 | A1 | 7/2006 | Ohnishi et al. |
| 2008/0004803 | A1 * | 1/2008 | Kikuchi .................. G01C 21/20 701/533 |
| 2008/0167799 | A1 * | 7/2008 | Geelen ................... G01C 21/34 701/532 |
| 2008/0215238 | A1 * | 9/2008 | Geelen ............... G01C 21/3655 701/414 |
| 2008/0275629 | A1 * | 11/2008 | Yun ..................... G01C 21/3492 701/118 |
| 2012/0095674 | A1 * | 4/2012 | Lee ..................... G01C 21/3658 701/423 |
| 2012/0226391 | A1 * | 9/2012 | Fryer ................. G01C 21/3407 701/1 |
| 2013/0054138 | A1 * | 2/2013 | Clark ................... G01C 21/203 701/468 |
| 2015/0057906 | A1 * | 2/2015 | Nefedov ................ G05D 13/02 701/93 |

FOREIGN PATENT DOCUMENTS

| EP | 1441196 | 7/2004 |
| EP | 2078928 | 7/2009 |
| JP | 2011232167 | 11/2011 |

OTHER PUBLICATIONS

Civilis et al., Techniques for Efficient Road-Network-Based Tracking of Moving Objects, 2005, 37 pages.*
International Search Report and Written Opinion for PCT/JP2014/002701, mailed Sep. 4, 2014 (10 pages).

* cited by examiner

Primary Examiner — Noosha Arjomandi
(74) Attorney, Agent, or Firm — Patent Law Works LLP

(57) ABSTRACT

The disclosure includes a system and method for providing zone information to a user. The system includes a processor and a memory storing instructions that when executed cause the system to: receive data describing a current location and a travel speed associated with a user; determine a travel status associated with the user based on the current location and the travel speed; create a zone of relevance for the user based on the travel status, the zone of relevance including one or more regions with each region being mapped to one or more regional circles; generate one or more queries for the zone of relevance; retrieve one or more query results that match the zone of relevance using the one or more queries; process the one or more query results to generate zone information relevant to the user; and provide the zone information to the user.

17 Claims, 14 Drawing Sheets

SYSTEM FOR PROVING PROACTIVE ZONE INFORMATION

BACKGROUND

The specification relates to providing zone information to a user. In particular, the specification relates to a navigation system for providing proactive zone information to a user based on a zone of relevance.

A user may want to know information ahead on a road before traveling down the road. In some examples, a user can listen to a traffic radio in order to obtain traffic information. However, the traffic radio may not provide traffic information relevant to the user's journey.

In some examples, a user can use a navigation system such as a global positioning system (GPS) to obtain information related to the user's journey. Existing navigation systems require the user to input a destination, calculate a route for the destination and then deliver information related to the calculated route to the user. However, the user may not want to input a destination to a navigation system when taking a journey. The user may not follow a route provided by the navigation system. The user may decide to go to a new destination in the middle of travel. In these cases, existing navigation systems fail to provide the user with information associated with the user's journey.

SUMMARY

According to one innovative aspect of the subject matter described in this disclosure, a system for providing zone information to a user includes a processor and a memory storing instructions that, when executed, cause the system to: receive data describing a current location and a travel speed associated with a user; determine a travel status associated with the user based on the current location and the travel speed; create a zone of relevance for the user based on the travel status, the zone of relevance including one or more regions with each region being mapped to one or more regional circles; generate one or more queries for the zone of relevance; retrieve one or more query results that match the zone of relevance using the one or more queries; process the one or more query results to generate zone information relevant to the user; and provide the zone information to the user.

In general, another innovative aspect of the subject matter described in this disclosure may be embodied in methods that include: receiving data describing a current location and a travel speed associated with a user; determining a travel status associated with the user based on the current location and the travel speed; creating a zone of relevance for the user based on the travel status, the zone of relevance including one or more regions with each region being mapped to one or more regional circles; generating one or more queries for the zone of relevance; retrieving one or more query results that match the zone of relevance using the one or more queries; processing the one or more query results to generate zone information relevant to the user; and providing the zone information to the user.

Other aspects include corresponding methods, systems, apparatus, and computer program products for these and other innovative aspects.

These and other implementations may each optionally include one or more of the following features. For instance, the operations include: receiving data describing a travel direction associated with the user; receiving data describing a local map associated with the current location; and matching the current location to the local map to determine a road type. For instance, the features include: determining a regional angle and a regional length for each region based on the travel status; generating the one or more regions based on the regional angle and the regional length; determining one or more circle centers and one or more radii for the one or more regional circles in each region; matching each region to the one or more corresponding regional circles that are determined by the one or more circle centers and the one or more radii; determining the zone of relevance including the one or more regions with each region being mapped to the one or more corresponding regional circles; the one or more queries including one or more circle queries with each circle query corresponding to one of the one or more regional circles in each region; filtering the one or more query results to remove duplicate data; filtering the one or more query results to remove data related to a direction opposite to a travel direction associated with the user; combining the one or more filtered query results to generate the zone information relevant to the user; the travel status being further determined based on the road type and the travel direction; the zone of relevance being configured based on at least one of a travel direction and a road type; and the one or more regions including a front region, a left region and a right region.

The present disclosure may be particularly advantageous in a number of respects. First, the system creates a zone of relevance for a user based on the user's travel status that includes one or more of a current location, a travel speed, a road type and one or more travel preferences associated with the user. The system dynamically configures the zone of relevance to match the latest travel status associated with the user. Second, the system is capable of providing proactive zone information ahead of a user's journey to the user based on the zone of relevance. The system dynamically updates the relevant zone information to match the user's travel status. Third, the system does not require a user to input a destination and does not need to calculate a route before providing zone information to the user. The system is capable of providing zone information relevant to the user without requiring the user to provide an input.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
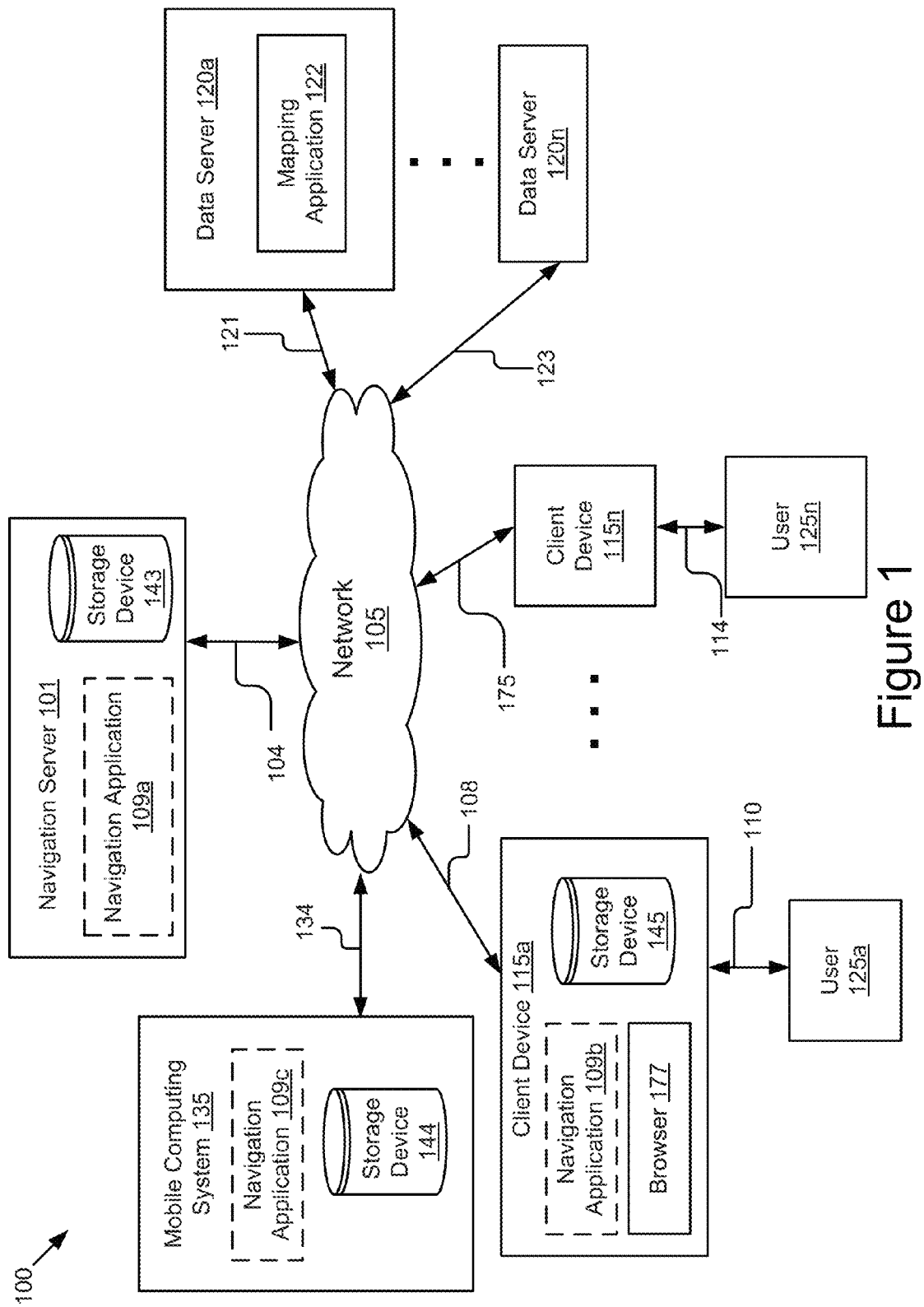
FIG. 1 is a block diagram illustrating an example system for providing zone information to a user.

FIG. 1 illustrates a block diagram of a system 100 for providing zone information to a user according to one embodiment. The illustrated system 100 includes a navigation server 101, one or more client devices 115, a mobile computing system 135 and one or more data servers 120. The entities of the system 100 are communicatively coupled via a network 105. In FIG. 1 and the remaining figures, a letter after a reference number, e.g., "115a," represents a reference to the element having that particular reference number. A reference number in the text without a following letter, e.g., "115," represents a general reference to instances of the element bearing that reference number.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the navigation server 101, the one or more client devices 115, the mobile computing system 135 and the one or more data servers 120, in practice one or more networks 105 can be connected to these entities.

In one embodiment, the navigation application 109a is operable on the navigation server 101, which is coupled to the network via signal line 104. The navigation server 101 can be a hardware server that includes a processor, a memory and network communication capabilities. In some embodiments, the navigation server 101 sends and receives data to and from one or more of the data servers 120a, 120n, the client devices 115a, 115n and the mobile computing system 135. The navigation server 101 also includes a storage device 143, which is described below in more detail. Although FIG. 1 illustrates one navigation server 101, the system 100 can include one or more navigation servers 101.

In another embodiment, the navigation application 109b is operable on a client device 115a, which is connected to the network 105 via signal line 108. In some embodiments, the client device 115a, 115n sends and receives data to and from one or more of the navigation server 101, the data servers 120a, 120n and the mobile computing system 135. The client device 115a, 115n is a computing device that includes a memory and a processor, for example a laptop computer, a desktop computer, a tablet computer, a mobile telephone, a personal digital assistant (PDA), a mobile email device or any other electronic device capable of accessing a network 105. In some embodiments, the client device 115a includes a browser 177 for accessing online services and a storage device 145 for storing data accessible by the client device 115a. The storage device 145 is described below in more detail. In the illustrated embodiment, the user 125a interacts with the client device 115a via signal line 110. The client device 115n is communicatively coupled to the network 105 via signal line 175. The user 125n interacts with the client device 115n via signal line 114. Although FIG. 1 illustrates two client devices 115, the system 100 can include one or more client devices 115.

In some instances, the navigation application 109b acts in part as a thin-client application that may be stored on the client device 115a, 115n and in part as components that may be stored on one or more of the navigation server 101 and the mobile computing system 135. For example, the navigation server 101 stores zone information relevant to a user in the storage device 143 and generates graphical data for providing a user interface that depicts the zone information to the user. The navigation application 109b sends instructions to the browser 177 to present the user interface on a display device (not shown) coupled to the client device 115.

In yet another embodiment, the navigation application 109c is operable on a mobile computing system 135, which is coupled to the network 105 via signal line 134. In some embodiments, the mobile computing system 135 sends and receives data to and from one or more of the navigation server 101, the data servers 120a, 120n and the client devices 115a, 115n. The mobile computing system 135 is any computing device that includes a memory and a processor. In one embodiment, the mobile computing system 135 is one of a vehicle, an automobile, a bus, a bionic implant or any other mobile system with non-transitory computer electronics (e.g., a processor, a memory or any combination of non-transitory computer electronics). In one embodiment, the mobile computing system 135 includes a laptop computer, a tablet computer, a mobile phone or any other mobile device including a processor and a memory. In some embodiments, the mobile computing system 135 includes a storage device 144 which is described below in more detail. In one embodiment, a user 125 interacts with the mobile computing system 135. For example, a user 125 can be a driver driving a vehicle or a passenger seating in a vehicle. Although FIG. 1 illustrates one mobile computing system 135, the system 100 can include one or more mobile computing systems 135.

The navigation application 109 is code and routines for providing zone information to a user. In some implementations, the navigation application 109 can be implemented using hardware including a field-programmable gate array (FPGA) or an application-specific integrated circuit (ASIC). In some other implementations, the navigation application 109 can be implemented using a combination of hardware and software. In some implementations, the navigation application 109 may be stored in a combination of the devices and servers, or in one of the devices or servers. The navigation application 109 is described below in more detail with reference to FIGS. 2-5.

The storage devices 143, 144 and 145 each can be a non-transitory memory that stores data for providing the functionality described herein. The storage devices 143, 144 and 145 each may be a dynamic random access memory (DRAM) device, a static random access memory (SRAM) device, flash memory or some other memory devices. In some embodiments, the storage devices 143, 144 and 145 each also include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In one embodiment, the storage devices 143, 144 and 145 each store one or more of: data describing historical travel data associated with a user (e.g., start locations, destinations, routes, travel durations, etc., associated with a user's past journeys); data describing one or more travel preferences associated with a user; data describing a current location associated with a user; data describing a travel speed associated with a user (e.g., a speed of a vehicle that a user is driving or seating in); data describing navigation instructions (e.g., routes from a first location to a second location); data describing a zone of relevance associated with a user; and zone information relevant to a user, etc. The zone of relevance and zone information are described below in more detail with reference to FIG. 2. The storage devices 143, 144 and 145 may store other data for providing the functionality described herein.

Example travel preferences include, but are not limited to, a user's driving preference (e.g., choosing a route without any highway, choosing a route with a fastest travel time, etc.) and a user's configuration preference for a zone of relevance (e.g., a number of regions, a size for each region, a shape for each region, an angle offset, a regional angle, a regional length, etc., configured by a user).

The data server 120a can be a hardware server that includes a processor, a memory and network communication capabilities. In some embodiments, the data server 120a sends and receives data to and from one or more of the navigation server 101, the client devices 115a, 115n and the mobile computing system 135. In the illustrated embodiment, the data server 120a is communicatively coupled to the network 105 via signal line 121. The data server 120n is communicatively coupled to the network 105 via signal line 123. Although FIG. 1 includes two data servers 120a, 120n, the system 100 may include one or more data servers 120.

In one embodiment, the data server 120a acts as a data source that provides various information to the navigation application 109. For example, the data server 120a can be a traffic provider that provides traffic information, road construction information, accident reports, etc., to the navigation application 109. In another example, the data server 120a provides data describing locations of refreshment services, gas stations, tourist places, events (e.g., sport events), weather conditions, etc., to the navigation application 109.

In the illustrated embodiment, the data server 120a includes a mapping application 122. The mapping application 122 can be code and routines for processing a request or a query received from the navigation application 109. In some embodiments, the mapping application 122 receives a request for a map from the navigation application 109. For example, the navigation application 109 sends a request for a local map to the mapping application 122. The mapping application 122 processes the request and returns data describing the local map to the navigation application 109.

In some embodiments, the mapping application 122 is capable of retrieving information relevant to a geographic area. For example, the mapping application 122 retrieves traffic information, weather information or other information related to a circular geographic area having a given radius and a given center point. In some instances, the mapping application 122 receives a query specifying a zone of relevance from the navigation application 109, generates a query result matching the zone of relevance and sends the query result to the navigation application 109. In some instances, the mapping application 122 receives one or more circle queries from the navigation application 109, generates one or more query results matching the one or more circle queries and sends the one or more query results to the navigation application 109. The circle queries and the query results are described below with reference to FIG. 2.

Example Navigation Application

Figure 2:
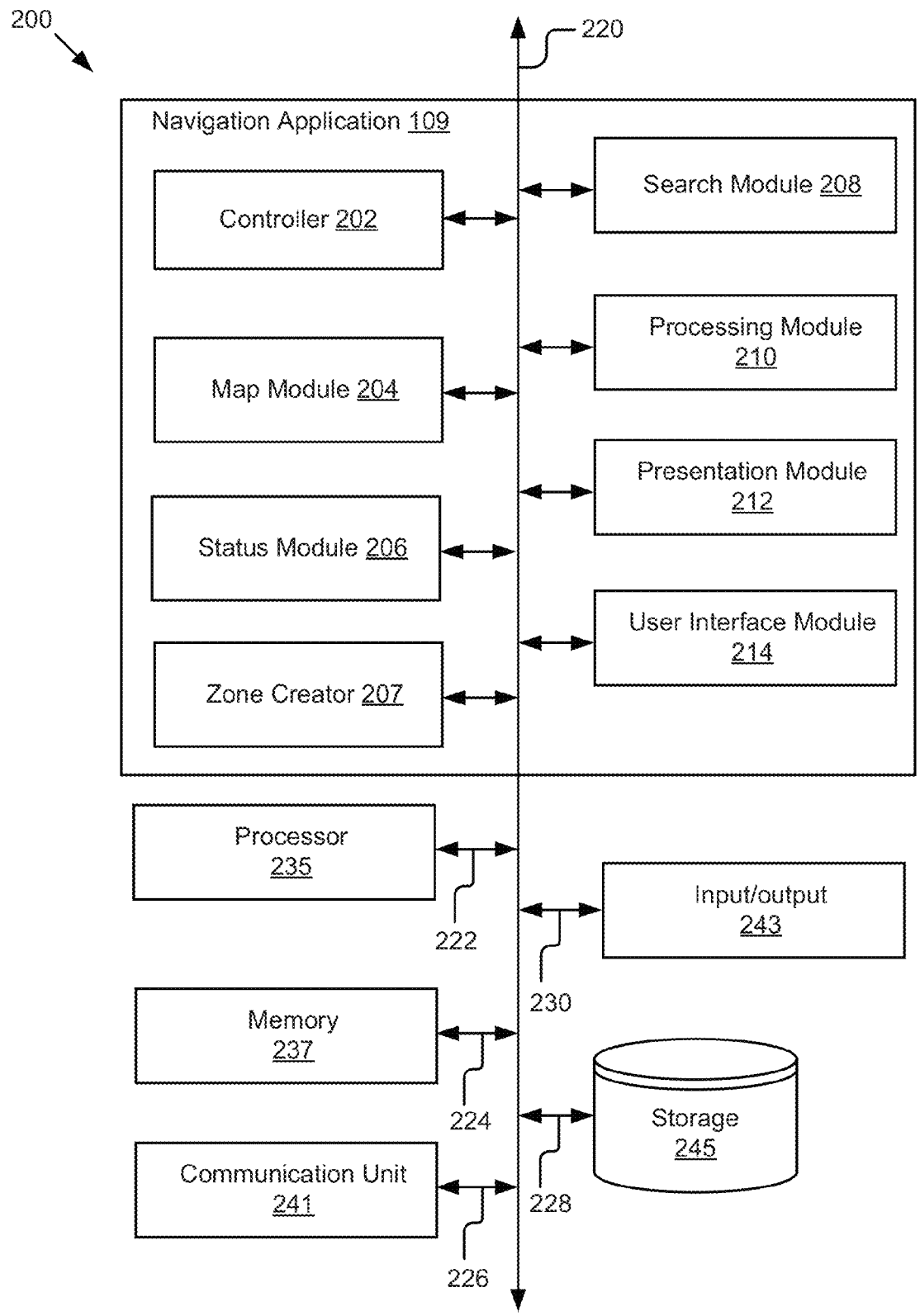
FIG. 2 is a block diagram illustrating an example of a navigation application.

Referring now to FIG. 2, an example of the navigation application 109 is shown in more detail. FIG. 2 is a block diagram of a computing device 200 that includes a navigation application 109, a processor 235, a memory 237, a communication unit 241, an input/output device 243 and a storage device 245 according to some embodiments. The components of the computing device 200 are communicatively coupled by a bus 220. The input/output device 243 is communicatively coupled to the bus 220 via signal line 230. In one embodiment, the computing device 200 is a navigation server 101. In another embodiment, the computing device 200 is a client device 115. In yet another embodiment, the computing device 200 is a mobile computing system 135.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the communication unit 241 is communicatively coupled to the bus 220 via signal line 226. The communication unit 241 transmits and receives data to and from one or more of the navigation server 101, the mobile computing system 135, the client device 115 and the data server 120. In some implementations, the communication unit 241 includes a port for direct physical connection to the network 105 or to another communication channel. For example, the communication unit 241 includes a USB, SD, CAT-5 or similar port for wired communication with the client device 115. In some implementations, the communication unit 241 includes a wireless transceiver for exchanging data with the client device 115 or other communication channels using one or more wireless communication methods, including IEEE 802.11, IEEE 802.16, BLUETOOTH®, dedicated short-range communications (DSRC) or another suitable wireless communication method.

In some implementations, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 245 can be a non-transitory memory that stores data for providing the functionality described herein. The storage device 245 may be a dynamic random access memory (DRAM) device, a static random access memory (SRAM) device, flash memory or some other memory devices. In some embodiments, the storage device 245 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 245 is communicatively coupled to the bus 220 via signal line 228. In one embodiment, the storage device 245 represents the storage device 143 in the navigation server 101. In another embodiment, the storage device 245 represents the storage device 144 in the mobile computing system 135. In yet another embodiment, the storage device 245 represents the storage device 145 in the client device 115.

In the illustrated embodiment, the navigation application 109 includes a controller 202, a map module 204, a status module 206, a zone creator 207, a search module 208, a processing module 210, a presentation module 212 and a user interface module 214. These components of the navigation application 109 are communicatively coupled via the bus 220.

The controller 202 can be software including routines for handling communications between the navigation application 109 and other components of the computing device 200. In some implementations, the controller 202 can be a set of instructions executable by the processor 235 to provide the functionality described below for handling communications between the navigation application 109 and other components of the computing device 200. In some implementations, the controller 202 can be stored in the memory 237 of the computing device 200 and can be accessible and executable by the processor 235. The controller 202 may be adapted for cooperation and communication with the processor 235 and other components of the computing device 200.

The controller 202 sends and receives data, via the communication unit 241, to and from one or more of the client device 115, the data server 120, the navigation server 101 and the mobile computing system 135 depending upon where the navigation application 109 is stored. For example, the controller 202 receives, via the communication unit 241, data describing a query result from the data server 120 and sends the query result to the search module 208. In another example, the controller 202 receives graphical data for providing a user interface to a user from the user interface module 214 and sends the graphical data to the client device 115 or the mobile computing system 135, causing the client device 115 or the mobile computing system 135 to present the user interface to the user.

In some implementations, the controller 202 receives data from other components of the navigation application 109 and stores the data in the storage device 245. For example, the controller 202 receives graphical data from the user interface module 214 and stores the graphical data in the storage device 245. In some implementations, the controller 202 retrieves data from the storage device 245 and sends the retrieved data to other components of the navigation application 109. For example, the controller 202 retrieves data describing a zone of relevance from the storage 245 and sends the data to the search module 208.

The map module 204 can be software including routines for matching a location on a map. In some implementations, the map module 204 can be a set of instructions executable by the processor 235 to provide the functionality described below for matching a location on a map. In some implementations, the map module 204 can be stored in the memory 237 of the computing device 200 and can be accessible and executable by the processor 235. The map module 204 may be adapted for cooperation and communication with the processor 235 and other components of the computing device 200.

In one embodiment, the map module 204 receives data describing a current location associated with a user. For example, the map module 204 receives data describing a current location associated with a user from a global positioning system (GPS) installed on a client device 115 or a mobile computing system 135 that is operated by the user. In one embodiment, the map module 204 retrieves data describing a local map associated with the current location of the user from a data server 120. For example, the map module 204 sends a request for a local map to the mapping application 122 via the network 105 and receives data describing the local map from the mapping application 122.

The map module 204 matches the current location on the local map and determines a road type associated with the current location of the user. For example, the map module 204 pinpoints the current location on the local map and determines a road type associated with the current location. Example road types include, but are not limited to, a highway, a local street, a parking lot, a trail, a bridge, a tunnel or a private road, etc. Other example road types are possible. In one embodiment, the map module 204 sends data describing the road type to the status module 206. In another embodiment, the map module 204 stores the data describing the road type in the storage 245.

The status module 206 can be software including routines for determining a travel status associated with a user. In some implementations, the status module 206 can be a set of instructions executable by the processor 235 to provide the functionality described below for determining a travel status associated with a user. In some implementations, the status module 206 can be stored in the memory 237 of the computing device 200 and can be accessible and executable by the processor 235. The status module 206 may be adapted for cooperation and communication with the processor 235 and other components of the computing device 200.

In one embodiment, the status module 206 receives data describing one or more of a current location, a travel speed, a current travel route and a travel direction associated with a user from a GPS installed on a client device 115 or a mobile computing system 135 operated by the user. Example travel directions include, but are not limited to, a direction heading south, a direction heading north, a direction heading southeast, a direction entering a highway, a direction exiting from a highway, etc. Other example travel directions are possible. In one embodiment, the status module 206 receives data describing a road type associated with the current location from the map module 204.

The status module 206 determines a travel status associated with the user. A travel status is data describing a state of travel associated with a user. In one embodiment, a travel status includes one or more of the current location, the travel speed, the travel route, the travel direction and the road type associated with the user. For example, a travel status indicates that a user is at the start of travel because an engine of a vehicle operated by the user is just turned on and the travel speed is zero. In another example, a travel status indicates that a user takes a left turn and moves forward in a new travel direction. In yet another example, a travel status indicates a user is traveling on a highway in a southbound direction with a speed of 65 miles per hour. In yet another example, a travel status indicates that a user stops at an intersection of two roads. In yet another example, a travel status indicates that a user is at the end of travel because the travel speed is zero and an engine of a vehicle operated by the user is just turned off. Other example travel statuses are possible.

In one embodiment, the status module 206 sends data describing the travel status to the zone creator 207. In another embodiment, the status module 206 stores data describing the travel status in the storage 245.

The zone creator 207 can be software including routines for creating a zone of relevance associated with a user. In some implementations, the zone creator 207 can be a set of instructions executable by the processor 235 to provide the functionality described below for creating a zone of relevance associated with a user. In some implementations, the zone creator 207 can be stored in the memory 237 of the computing device 200 and can be accessible and executable by the processor 235. The zone creator 207 may be adapted for cooperation and communication with the processor 235 and other components of the computing device 200.

A zone of relevance is a geographic area or a combination of geographic areas relevant to a user. For example, a zone of relevance is a geographic area or a combination of geographic areas extended forward from a current location associated with a user. In one embodiment, a zone of relevance includes one or more regions. A region is a sub-area from the zone of relevance. In one embodiment, a region is a sub-area associated with a current location of a user. For example, a region is a sub-area extended forward from a current location of a user. In one embodiment, a region is a sub-area having a triangular shape, a rectangular shape, a circular shape or any other geometry shape. In another embodiment, a region is formed by a combination of geographic areas having various geometry shapes. For example, a region is formed by a combination of circular geographic areas as illustrated in FIG. 7E. Example regions in zones of relevance are illustrated with reference to FIGS. 7A-7F.

In one embodiment, the zone of relevance includes a front region, a left region and a right region. A front region can be a region where a user is predicted to travel forward from a current location. For example, a front region is a region aligned with a travel direction associated with a user. In another example, if a user is traveling on a highway, a front region is a region along the highway that is extended ahead from the current location of the user. When facing towards the travel direction associated with the user, a left region is a region on the left hand side of the front region and a right region is a region on the right hand side of the front region.

Figure 7A:
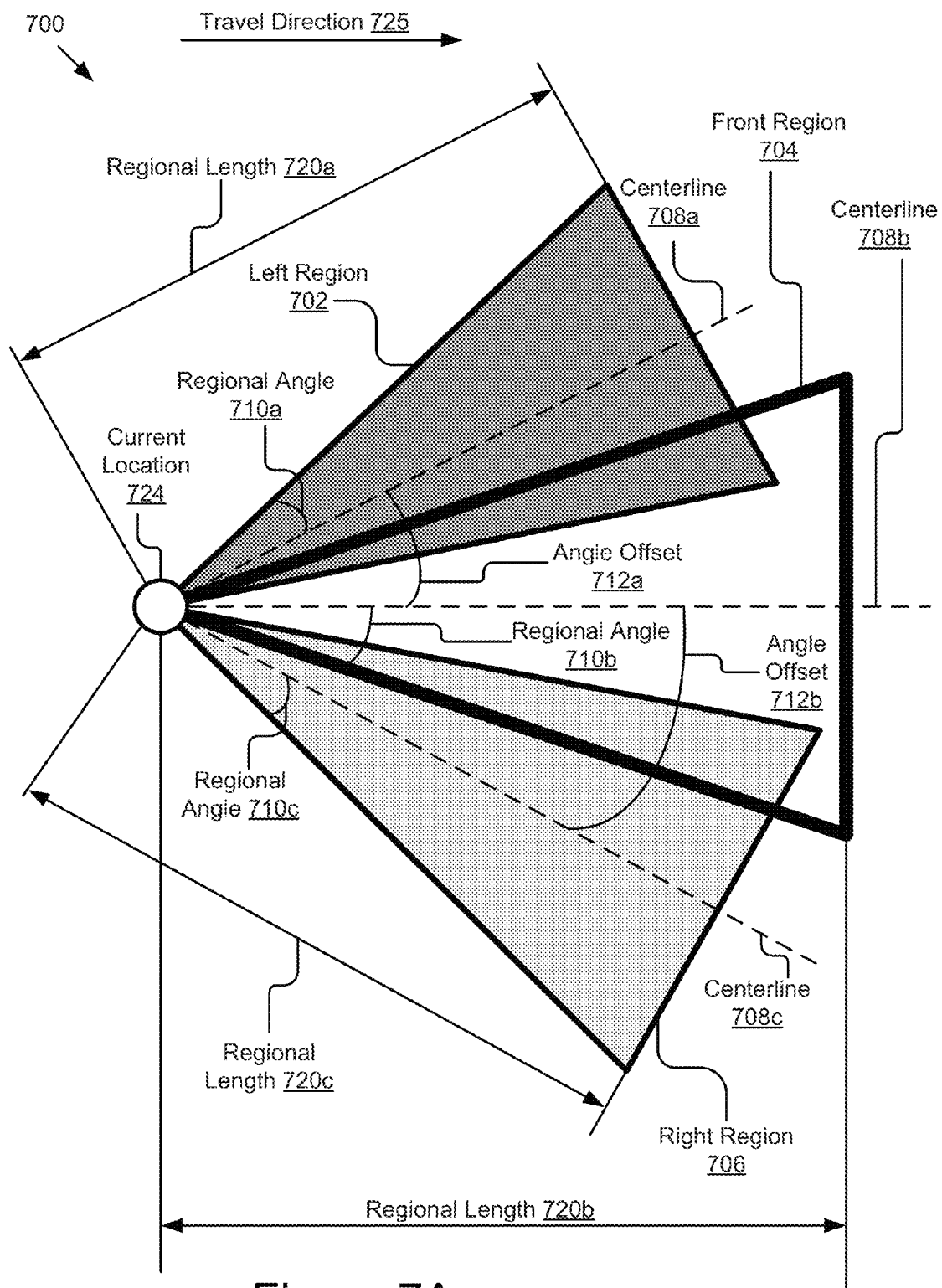
FIGS. 7A-7F are graphic representations illustrating various zones of relevance according to some embodiments.

Turning to FIG. 7A, a zone of relevance that includes a front region 704, a left region 702 and a right region 706 is illustrated according to some examples. The front region 704, the left region 702 and the right region 706 each have a triangular shape (e.g., an isosceles triangular shape). FIG. 7A illustrates a current location 724 and a travel direction 725 associated with the user.

In some embodiments, a centerline is a line that divides a region into two equal parts. For example, a centerline 708a divides the left region 702 into two equal parts, a centerline 708b divides the front region 704 into two equal parts, and a centerline 708c divides the right region 706 into two equal parts.

In some embodiments, a regional angle is an angle formed by a centerline and a boundary line of the region, where the boundary line extends from the current location associated with the user. FIG. 7A illustrates a regional angle 710a of the left region 702, a regional angle 710b of the front region 704 and a regional angle 710c of the right region 706.

In some embodiments, a regional length is a distance from the current location associated with the user to a bottom boundary of the region. For example, a regional length is a distance from the current location to the bottom side of the triangular region. FIG. 7A illustrates a regional length 720a of the left region 702, a regional length 720b of the front region 704 and a regional length 720c of the right region 706.

In some embodiments, an angle offset associated with two regions is an angle between two centerlines of the two regions. FIG. 7A illustrates an angle offset 712a associated with the left region 702 and the front region 704 and an angle offset 712b associated with the front region 704 and the right region 706.

Turning back to FIG. 2, in one embodiment the zone creator 207 receives data describing a travel status associated with a user from the status module 206. The zone creator 207 determines a zone of relevance including one or more regions for the user based on the travel status of the user. For example, the zone creator 207 determines a size of the zone of relevance (e.g., a size of a geographic area specified by the zone of relevance) based on one or more of the current location, the travel speed, the travel direction, the road type and one or more travel preferences associated with the user.

In some implementations, the zone creator 207 determines a number of regions, a size for each region and a distance between two regions based on the travel status. For example, the zone creator 207 determines one or more of (1) a regional angle for each region, (2) a regional length for each region and (3) an angle offset between two adjacent regions based on one or more of the current location, the road type, the travel direction and the travel speed, etc. In some implementations, each region has the same regional angle and the same regional length, and each two adjacent regions have the same angle offset. In some other implementations, each region has a different regional angle and a different regional length, and each two adjacent regions have a different angle offset.

The zone creator 207 is capable of continuously and dynamically configuring the zone of relevance to accommodate updates on the travel speed, the road type and the travel direction, etc., as the user travels forward. For example, assume the zone creator 207 generates a front region, a left region and a right region for the zone of relevance. At the start of travel, the zone creator 207 generates: (1) a first regional angle and a first regional length for the front region; (2) a second regional angle and a second regional length for the left region; (3) a third regional angle and a third regional length for the right region; (4) a first angle offset between the front region and the left region; and (5) a second angle offset between the front region and the right region. The zone of relevance formed by the front region, left region and right region covers a widespread geographic area extended forward from the user's current location (e.g., a widespread geographic area extended forward on the user's travel direction).

As the user moves forward, the zone creator 207 gradually narrows down the zone of relevance and elongates the zone of relevance to be focused on the travel direction by one or more of: (1) reducing the first regional angle and/or increasing the first regional length for the front region; (2) reducing the second regional angle and/or increasing the second regional length for the left region; (3) reducing the third regional angle and/or increasing the third regional length for the right region; (4) reducing the first angle offset between the front region and the left region; and (5) reducing the second angle offset between the front region and the right region.

If the user enters a road where available directional choices are limited (e.g., a highway), the zone creator 207 further narrows down the zone of relevance and elongates the zone of relevance to be even more focused on the user's travel direction by further: (1) reducing the first regional angle and/or increasing the first regional length for the front region; (2) reducing the second regional angle and/or increasing the second regional length for the left region; (3) reducing the third regional angle and/or increasing the third regional length for the right region; (4) reducing the first angle offset between the front region and the left region; and/or (5) reducing the second angle offset between the front region and the right region. In this case, the zone of relevance is concentrated on a route determined by the road (e.g., a route defined by the highway). The zone of relevance may also include intersections close by the route.

In one embodiment, the zone creator 207 matches each generated region into one or more sub-regions, where each sub-region is located either completely or partially within the respective region. The sub-region can be of a rectangular shape, a square shape, a circular shape or any other shape. A sub-region with a circular shape that is located at least partially within a region is referred to as a regional circle of the region. In some instances, the zone creator 207 matches each generated region to one or more regional circles, where each regional circle is located either completely or partially within the respective region. For example, the zone creator 207 determines one or more circle centers and one or more radii for one or more regional circles in each region, where the one or more regional circles are defined by the one or more circle centers and the one or more radii. The matching process between a region and one or more regional circles is described below with reference to FIGS. 5-6C.

In some implementations, the one or more regional circles have increasing radii. The one or more regional circles have circle centers located on the centerline of the respective region. In some other implementations, some regional circles have the same radii, and some regional circles have circle centers not located on the centerline of the respective region. In one embodiment, the regional circles can be overlapping circles. For example, a regional circle can be overlapping with another adjacent regional circle in the same region. Example regions with overlapping regional circles are illustrated in FIG. 7E. In another embodiment, the regional circles can be non-overlapping circles. For example, a regional circle does not overlap with another adjacent regional circle in the same region.

In one embodiment, the zone creator 207 creates a zone of relevance that includes one or more regions (e.g., a left region, a front region and a right region) with each region being mapped to one or more regional circles as described above. The zone creator 207 sends data describing the zone of relevance including all the regional circles in all the regions to the search module 208. In one embodiment, the zone creator 207 stores the data describing the zone of relevance in the storage 245.

The search module 208 can be software including routines for searching one or more data sources to retrieve a query result matching a query. In some implementations, the search module 208 can be a set of instructions executable by the processor 235 to provide the functionality described below for searching one or more data sources to retrieve a query result matching a query. In some implementations, the search module 208 can be stored in the memory 237 of the computing device 200 and can be accessible and executable by the processor 235. The search module 208 may be adapted for cooperation and communication with the processor 235 and other components of the computing device 200.

A query result is a search result matching a query. For example, a query result matches a zone of relevance specified by a query. In another example, a query result includes one or more of a road map, traffic information, road construction information, accident reports, locations of refreshment services, gas stations, tourist places, events (e.g., sport events), weather conditions, the user's historical travel data and any other data related to the zone of relevance.

In one embodiment, the search module 208 receives data describing a zone of relevance from the zone creator 207. The search module 208 generates a query for the zone of relevance and searches one or more data sources to retrieve a query result that matches the query. Example data sources include, but are not limited to, the navigation server 101, the mobile computing system 135 and one or more data servers 120. For example, the search module 208 searches the storage device 144 in the mobile computing system 135 to retrieve the user's historical travel data related to the zone of relevance. In another example, the search module 208 searches one or more data servers 120 to retrieve one or more of real-time traffic updates, locations of gas stations, weather condition updates, etc., related to the zone of relevance. The search module 208 sends the query result to the processing module 210.

In one embodiment, the search module 208 receives data describing a zone of relevance that includes one or more regions, where each region is mapped to one or more regional circles. The search module 208 generates one or more circle queries for the zone of relevance, with each circle query corresponds to one regional circle. A circle query is a query used to retrieve a query result that matches a regional circle. The search module 208 searches one or more data sources to retrieve one or more query results using the one or more circle queries. Each query result corresponds to one of the circle queries and matches a regional circle associated with the respective circle query. For example, a query result corresponding to a circle query includes one or more of traffic information, locations of refreshment services, gas stations, tourist places, events, weather conditions, the user's historical travel data and/or any other data matching a regional circle related to the circle query.

In one embodiment, the search module 208 stores the one or more query results in the storage 245. In another embodiment, the search module 208 sends the one or more query results to the processing module 210.

The processing module 210 can be software including routines for processing one or more query results. In some implementations, the processing module 210 can be a set of instructions executable by the processor 235 to provide the functionality described below for processing one or more query results. In some implementations, the processing module 210 can be stored in the memory 237 of the computing device 200 and can be accessible and executable by the processor 235. The processing module 210 may be adapted for cooperation and communication with the processor 235 and other components of the computing device 200.

In one embodiment, the processing module 210 receives one or more query results from the search module 208 and processes the one or more query results. In some implementations, the processing module 210 filters the one or more query results to remove duplicate data (e.g., duplicate traffic reports, duplicate weather forecasts, etc.). In some implementations, the processing module 210 filters the one or more query results to remove data related to a direction opposite to the user's travel direction. For example, assume a user travels on a highway in a southbound direction. The processing module 210 filters the query results to remove traffic information, road construction information, accident reports, etc., that only impact traffic flow in a northbound direction of the highway.

The processing module 210 generates zone information relevant to the user based on the processed query results. For example, the processing module 210 combines the one or more filtered query results to generate zone information relevant to the user. Zone information is any information related to a zone of relevance associated with a user. In one embodiment, the zone information matches the zone of relevance associated with the user. For example, the zone information matches one or more regional circles in one or more regions in the zone of relevance. For example, the zone information includes one or more of traffic information (e.g., real-time traffic updates, accident reports, current traffic state in the zone of relevance), road construction information, locations of refreshment services, gas stations, tourist places, events, weather conditions and the user's historical travel data related to the zone of relevance. The zone information may include other information related to the zone of relevance.

In one embodiment, the processing module 210 sends the zone information to the presentation module 212. In another embodiment, the processing module 210 stores the zone information in the storage 245.

The presentation module 212 can be software including routines for presenting zone information to a user. In some implementations, the presentation module 212 can be a set of instructions executable by the processor 235 to provide the functionality described below for presenting zone information to a user. In some implementations, the presentation module 212 can be stored in the memory 237 of the computing device 200 and can be accessible and executable by the processor 235. The presentation module 212 may be adapted for cooperation and communication with the processor 235 and other components of the computing device 200.

In one embodiment, the presentation module 212 receives zone information relevant to a user from the processing module 210. The presentation module 212 provides the zone information to the user. For example, the presentation module 212 delivers the zone information to the client device 115 and/or the mobile computing system 135, causing the client device 115 and/or the mobile computing system 135 to play the zone information to the user using a speaker system (not shown). In another example, the presentation module 212 instructs the user interface module 214 to generate graphical data for providing a user interface that depicts the zone information to the user.

The user interface module 214 can be software including routines for generating graphical data for providing user interfaces to users. In some implementations, the user interface module 214 can be a set of instructions executable by the processor 235 to provide the functionality described below for generating graphical data for providing user interfaces to users. In some implementations, the user interface module 214 can be stored in the memory 237 of the computing device 200 and can be accessible and executable by the processor 235. The user interface module 214 may be adapted for cooperation and communication with the processor 235 and other components of the computing device 200.

In some implementations, the user interface module 214 generates graphical data for providing a user interface that presents zone information to a user. The user interface module 214 sends the graphical data to a client device 115 and/or a mobile computing system 135, causing the client device 115 and/or the mobile computing system 135 to present the user interface to the user.

In some implementations, the user interface module 214 generates graphical data for providing a user interface to a user, allowing the user to configure a zone of relevance. For example, the user interface allows the user to configure a number of regions, a size of each region and a shape of each region. The user interface module 214 may generate graphical data for providing other user interfaces to users.

Methods

Figure 3:
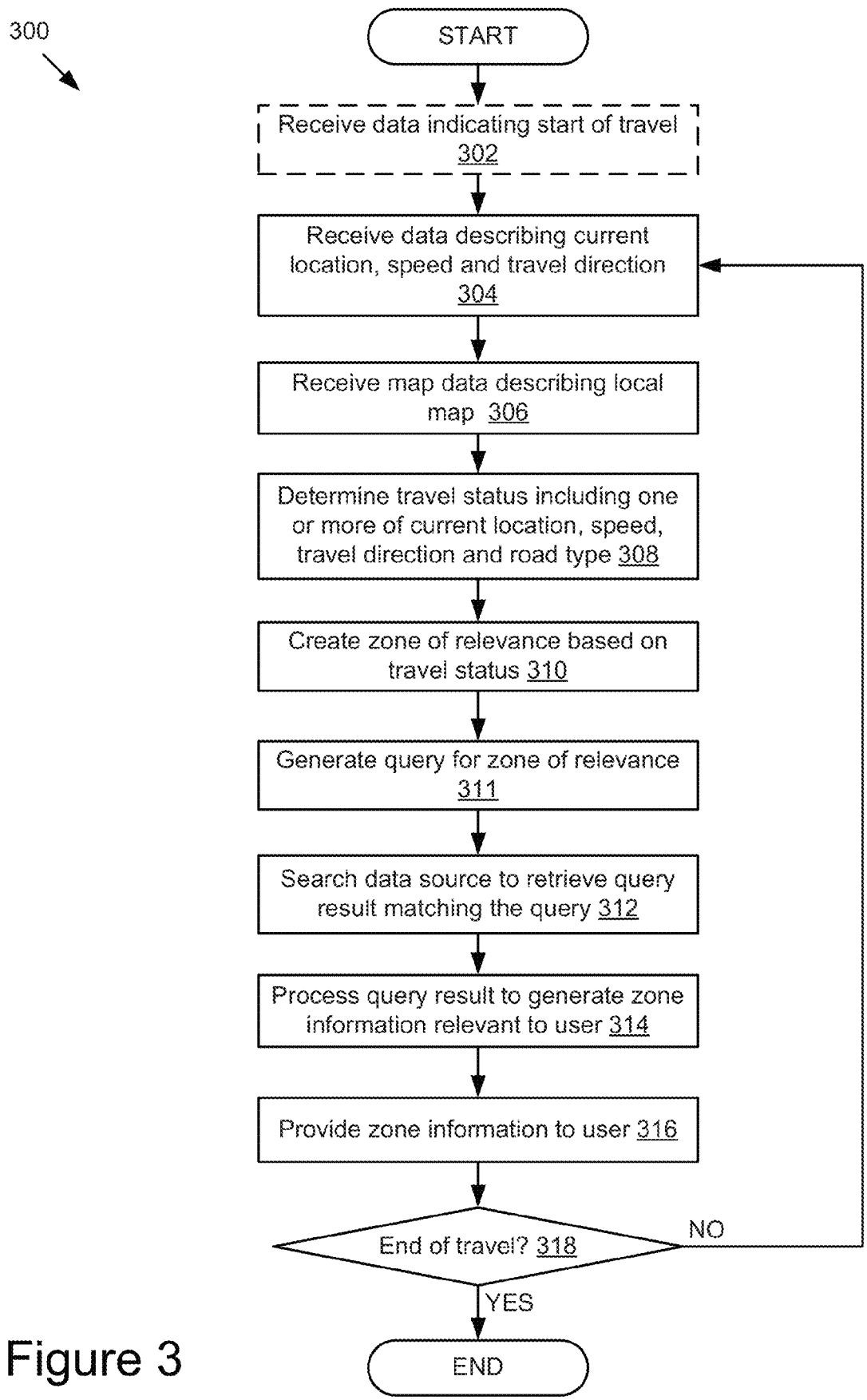
FIG. 3 is a flowchart of an example method for providing zone information to a user.

FIG. 3 is a flowchart of an example method 300 for providing zone information to a user. In one embodiment, the controller 202 optionally receives 302 data indicating a start of travel associated with a user. For example, the controller 202 receives data indicating an engine of a vehicle operated by a user is turned on. The controller 202 receives 304 data describing one or more of a current location, a travel speed and a travel direction associated with the user. The controller 202 receives 306 map data describing a local map associated with the current location. The status module 206 determines 308 a travel status associated with the user including one or more of the current location, the travel speed, the travel direction and a road type associated with the current location. The zone creator 207 creates 310 a zone of relevance for the user based on the travel status. The search module 208 generates 311 a query for the zone of relevance. The search module 208 searches 312 one or more data sources to retrieve a query result matching the query. The processing module 210 processes 314 the query result to generate zone information relevant to the user. The presentation module 212 provides 316 the zone information to the user. The method 300 determines 318 whether the user is at the end of travel. If the user is at the end of travel, the method 300 ends. Otherwise, the method 300 moves to step 304.

Figure 4A:
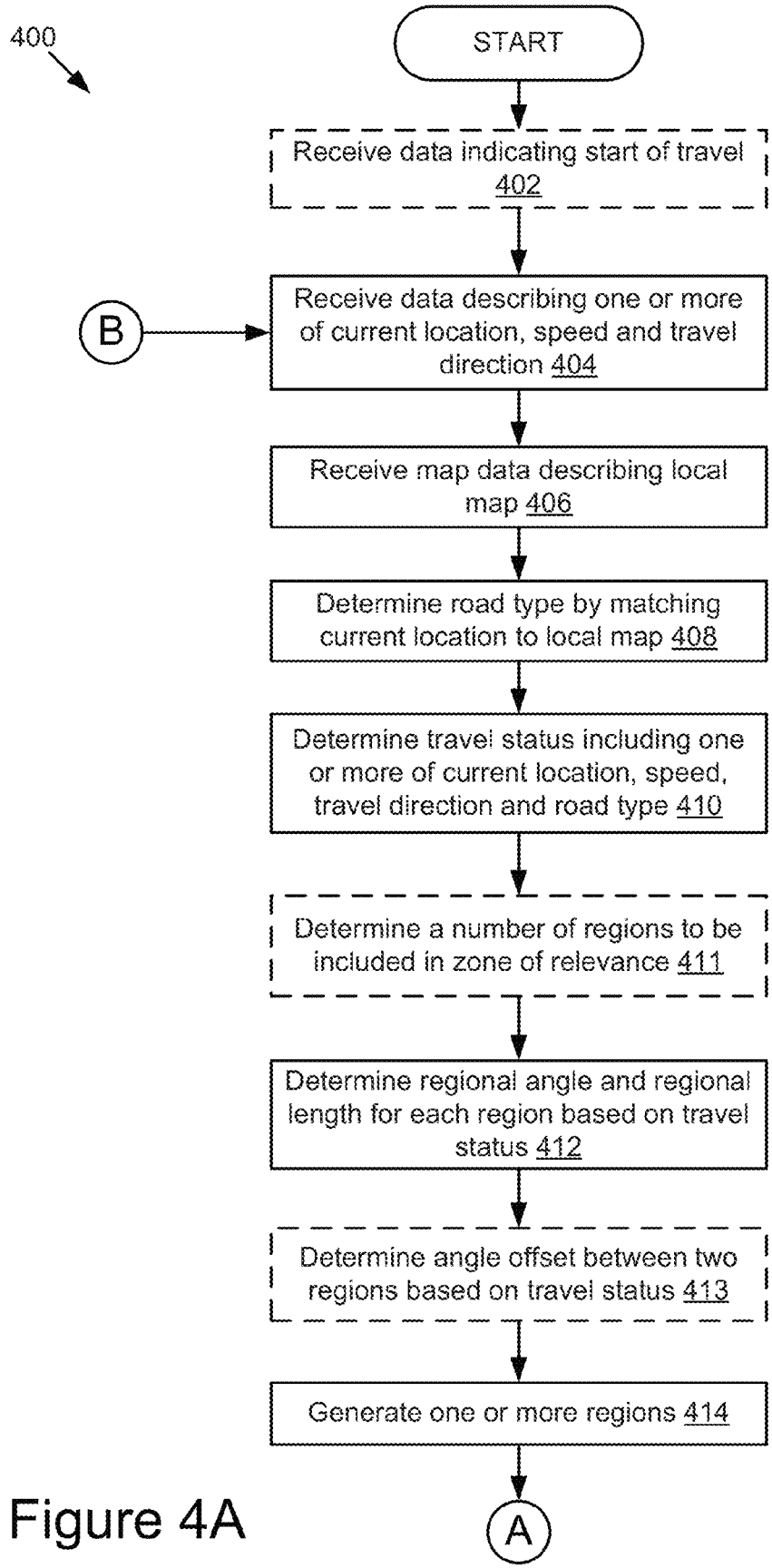
FIGS. 4A and 4B are flowcharts of another example method for providing zone information to a user.
Figure 4B:
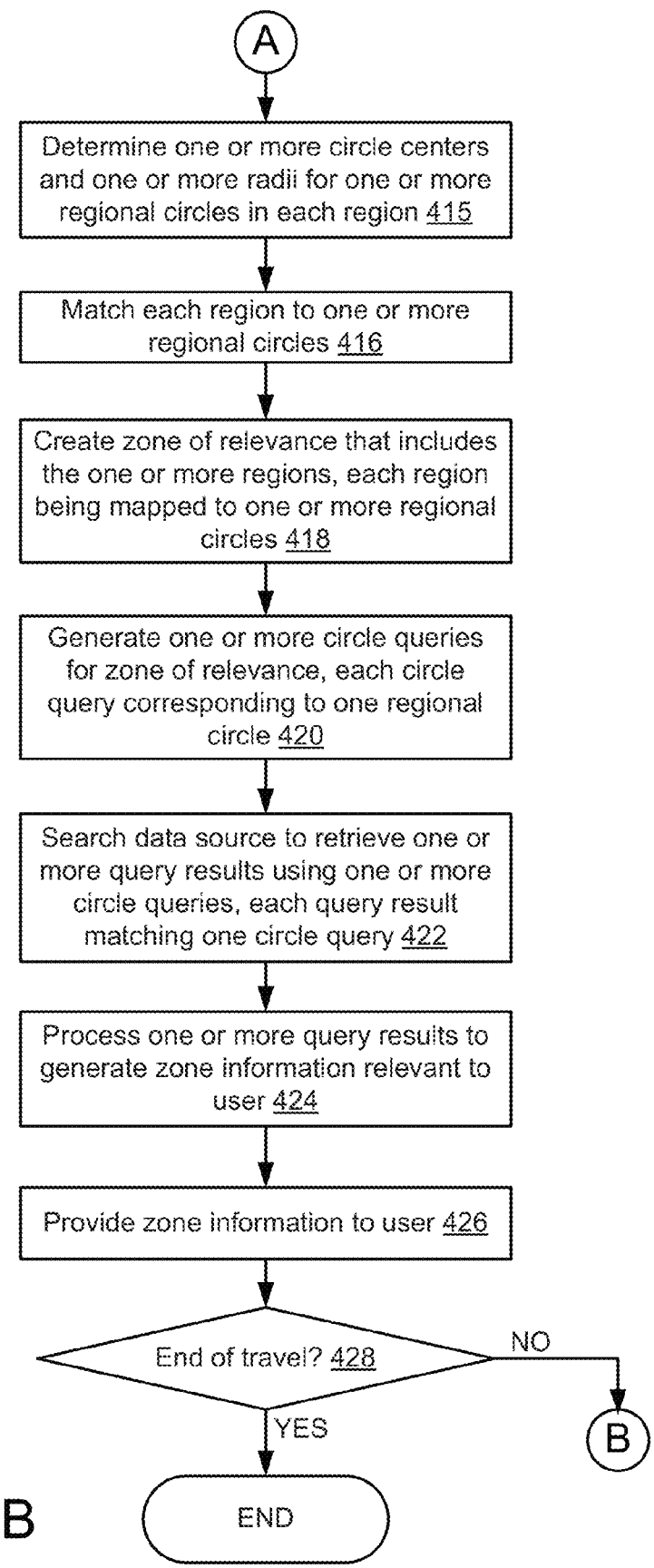

FIGS. 4A and 4B are flowcharts of another example method 400 for providing zone information to a user. Referring to FIG. 4A, the controller 202 optionally receives 402 data indicating a start of travel associated with the user. The controller 202 receives 404 data describing one or more of a current location, a travel speed and a travel direction associated with the user. The controller 202 receives 406 map data describing a local map associated with the current location. The map module 204 determines 408 a road type associated with the current location by matching the current location to the local map. The status module 206 determines 410 a travel status associated with the user including one or more of the current location, the travel speed, the travel direction and the road type.

The zone creator 207 optionally determines 411 a number of regions to be included in a zone of relevance. The zone creator 207 determines 412 a regional angle and a regional length for each region based on the travel status. Optionally, the zone creator 207 determines 413 an angle offset between two adjacent regions based on the travel status. The zone creator 207 generates 414 one or more regions based on one or more of the number of regions, the regional angle for each region, the regional length for each region and the angle offset between two adjacent regions.

Referring to FIG. 4B, the zone creator 207 determines 415 one or more circle centers and one or more radii for one or more regional circles in each region. The zone creator 207 matches 416 each region to the one or more regional circles. The zone creator 207 creates 418 a zone of relevance that includes the one or more regions, with each region being mapped to the one or more corresponding regional circles. The search module 208 generates 420 one or more circle queries for the zone of relevance, with each circle query corresponding to one regional circle. The search module 208 searches 422 one or more data sources to retrieve one or more query results using the one or more circle queries. Each query result matches one of the circle queries. The processing module 210 processes 424 the one or more query results to generate zone information relevant to the user. The presentation module 212 provides 426 the zone information to the user.

The method 400 determines 428 whether the user is at the end of travel. If the user is at the end of travel, the method 400 ends. Otherwise, the method 400 moves to step 404.

Figure 5:
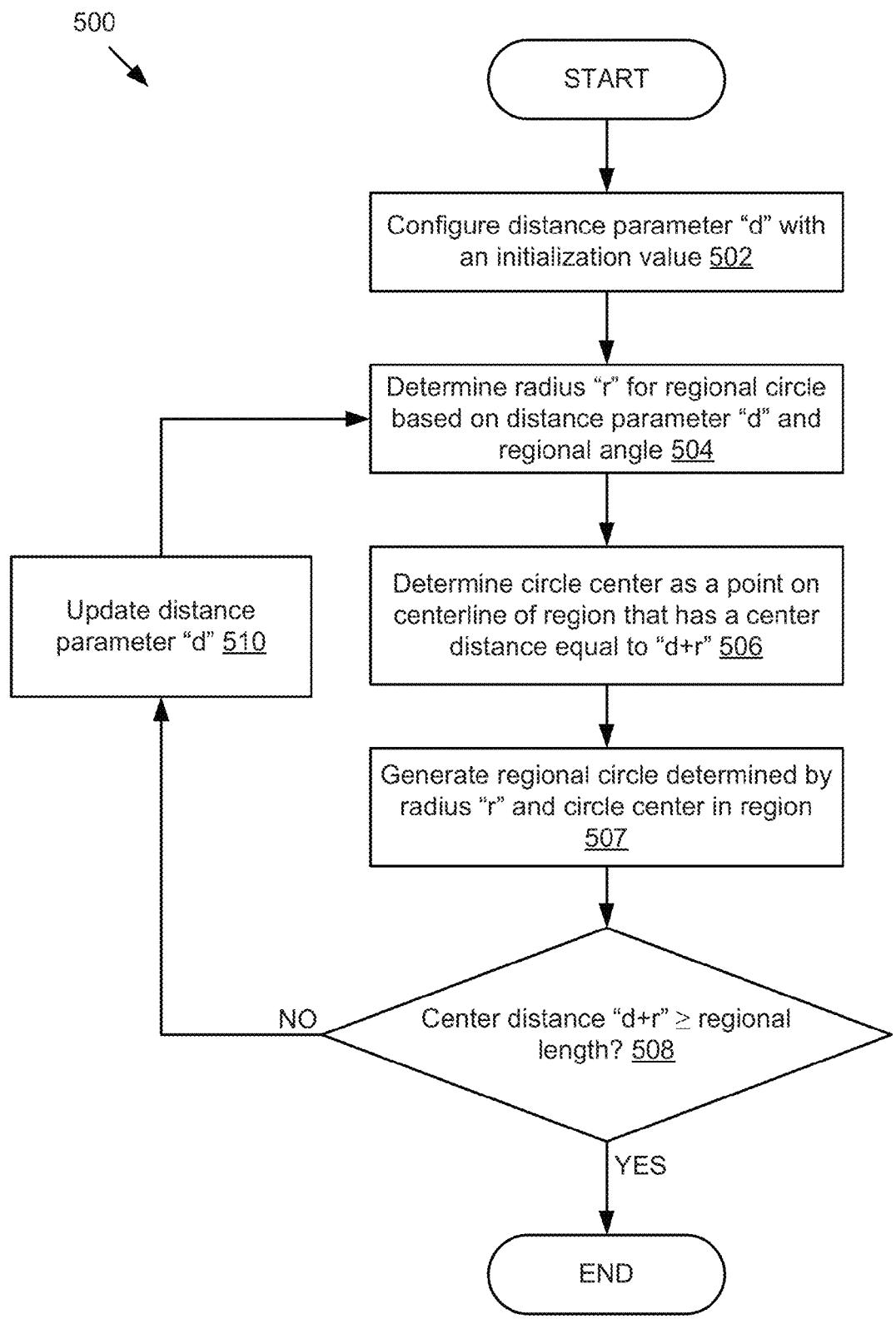
FIG. 5 is a flowchart of an example method for matching a region with one or more regional circles.

FIG. 5 is a flowchart of an example method 500 for matching a region with one or more regional circles. In the following description, the example method 500 is described with reference to FIGS. 6A-6C. In one embodiment, the zone creator 207 configures 502 a distance parameter (represented as "d") with an initialization value. For example, the zone creator 207 initializes the distance parameter "d" with a default value. A distance parameter is data representing a distance to an origin point on the centerline of the region. In some examples, the origin point is the current location of the user. The zone creator 207 determines 504 a radius (represented as "r") for a regional circle based on the distance parameter "d" and the regional angle (represented as "α") associated with the region. For example, the zone creator 207 determines the radius as:

$$r = \frac{d \sin\alpha}{1 - \sin\alpha}$$

The zone creator 207 determines 506 a circle center for the regional circle as a point on the centerline that has a center distance equal to "d+r." A center distance is a distance between the circle center and the origin point. For example, a center distance is equal to "d+r." The zone creator 207 generates 507 the regional circle determined by the radius "r" and the circle center. The zone creator 207 determines 508 whether the center distance of the latest generated regional circle is equal to or greater than the regional length of the region. For example, the zone creator 207 determines whether "d+r" is equal to or greater than the regional length of the region.

If the center distance is less than the regional length (e.g., the center distance is neither equal to nor greater than the regional length), the zone creator 207 updates 510 the distance parameter "d." In one embodiment, the regional circles in the region are non-overlapping circles, and the zone creator 207 increases the value of the distance parameter "d" by adding the value of "2r" to the distance parameter "d" (e.g., "d" is updated to be "d+2r"). In another embodiment, the regional circles in the region are overlapping circles with an overlapping distance (represented as "$d_p$") on the centerline. An overlapping distance is a distance on the centerline where two adjacent regional circles overlap with each other. The zone creator 207 increases the value of the distance parameter "d" by adding the value of "$2r-d_p$" to the distance parameter "d" (e.g., "d" is updated to be "$d+2r-d_p$").

After updating the distance parameter "d," the zone creator 207 continues to generate additional regional circles for the region by repeating the operations 504-510 until the center distance "d+r" is equal to or greater than the regional length.

Figure 6A:
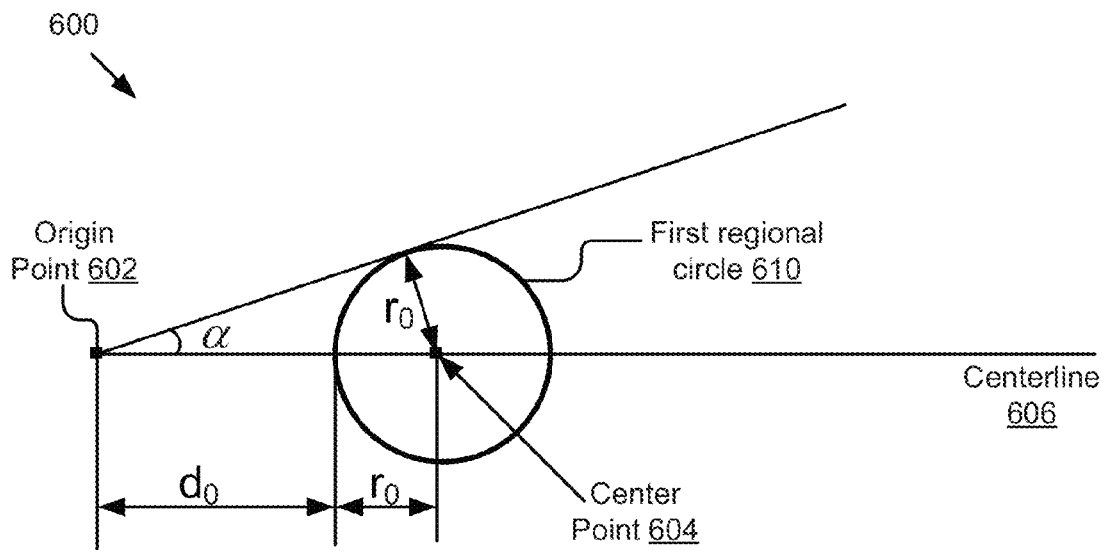
FIGS. 6A-6C are graphic representations illustrating a process to match a region with one or more regional circles according to some embodiments.

For example, referring to FIG. 6A the zone creator 207 configures the distance parameter "d" with an initialization value "$d_0$" (e.g., $d=d_0$). A radius for a first regional circle 610 is illustrated as "$r_0$." As illustrated in FIG. 6A, $$\sin\alpha = \frac{r_0}{d_0 + r_0},$$

and the zone creator 207 determines the radius "$r_0$" for the first regional circle 610 as $$r_0 = \frac{d_0 \sin\alpha}{1 - \sin\alpha}$$

The zone creator 207 determines a circle center (a center point 604) for the first regional circle 610 as a point on the centerline 606 of the region, where a center distance between the center point 604 and the origin point 602 is equal to "$d_0+r_0$." The zone creator 207 generates the first regional circle 610 which is determined by the radius "$r_0$" and the center point 604.

Figure 6B:
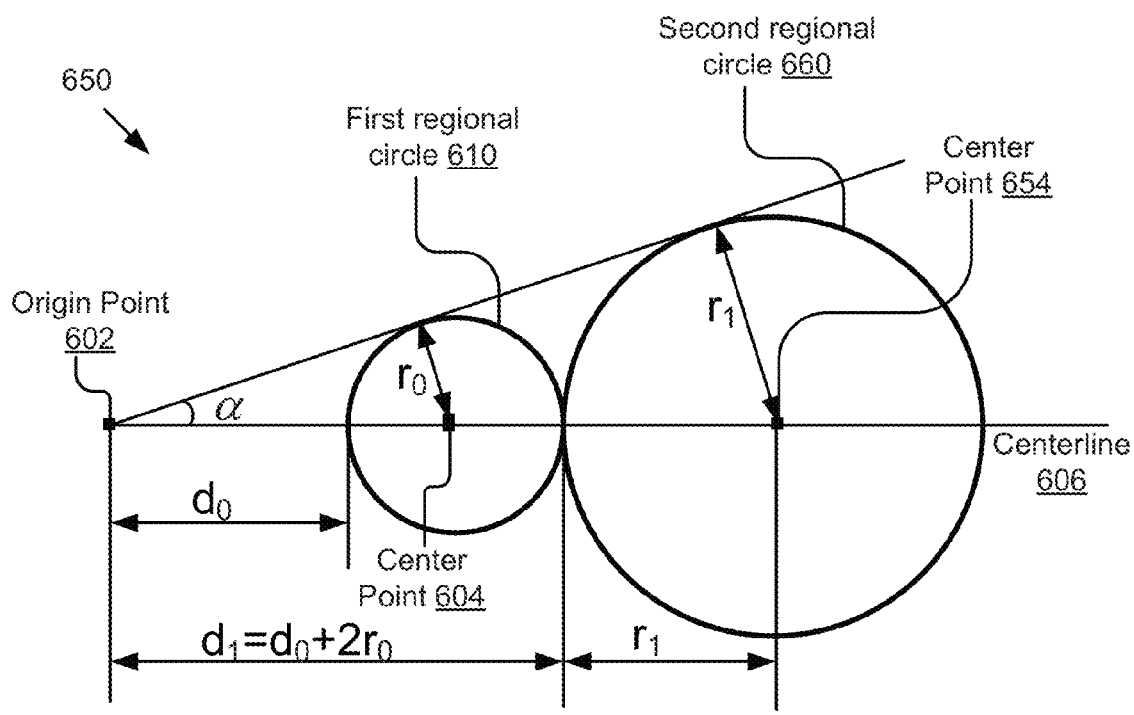

Because the center distance "$d_0+r_0$" is less than the regional length, the zone creator 207 continues to generate additional regional circles in the region. In one embodiment, the regional circles in the region are non-overlapping circles as illustrated in FIG. 6B, and the zone creator 207 updates the distance parameter to be "$d_1=d_0+2r_0$," where the symbol "$d_1$" represents the updated distance parameter. In another embodiment, the regional circles in the region are overlapping circles with an overlapping distance "$d_p$" as illustrated in FIG. 6C, and the zone creator 207 updates the distance parameter to be "$d_1=d_0+2r_0-d_p$."

Figure 6C:
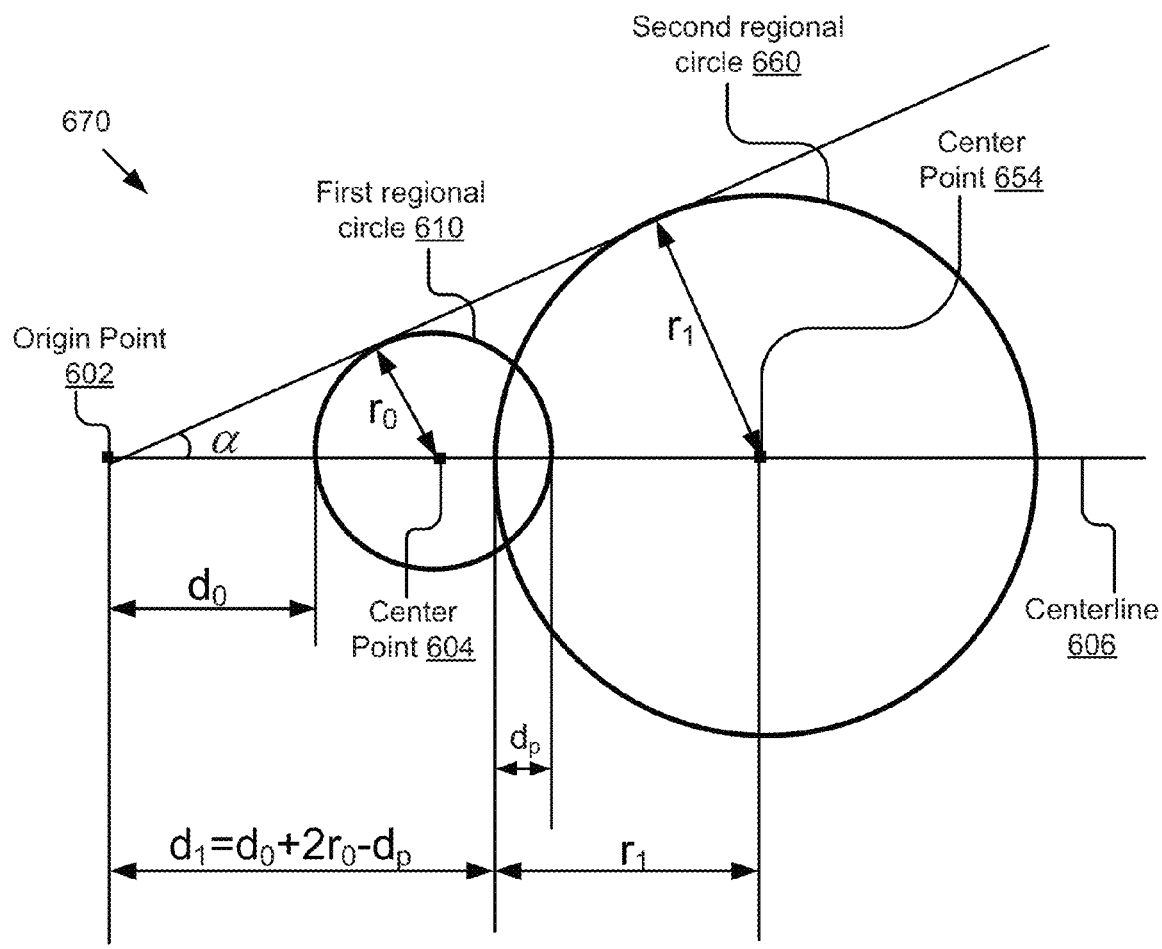

In either embodiment illustrated in FIG. 6B or FIG. 6C, the zone creator 207 determines a radius (represented as "$r_1$") for a second regional circle 660 as $$r_1 = \frac{d_1 \sin\alpha}{1 - \sin\alpha}.$$

The zone creator 207 determines a circle center (a center point 654) for the second regional circle 660 as a point on the centerline 606 of the region, where a center distance between the center point 654 and the origin point 602 is equal to "$d_1+r_1$." The zone creator 207 generates the second regional circle 660 which is determined by the radius "$r_1$" and the center point 654. If a center distance of the latest generated regional circle is neither equal to nor greater than the regional length, the zone creator 207 may continue to generate additional regional circles for the region by performing operations similar to those described above.

Graphic Representations

FIGS. 6A-6C are graphic representations 600, 650, 670 illustrating a process to match a region to one or more regional circles according to some embodiments. FIGS. 6A-6C are described above with reference to FIG. 5, and the description will not be repeated here.

Figure 7B:
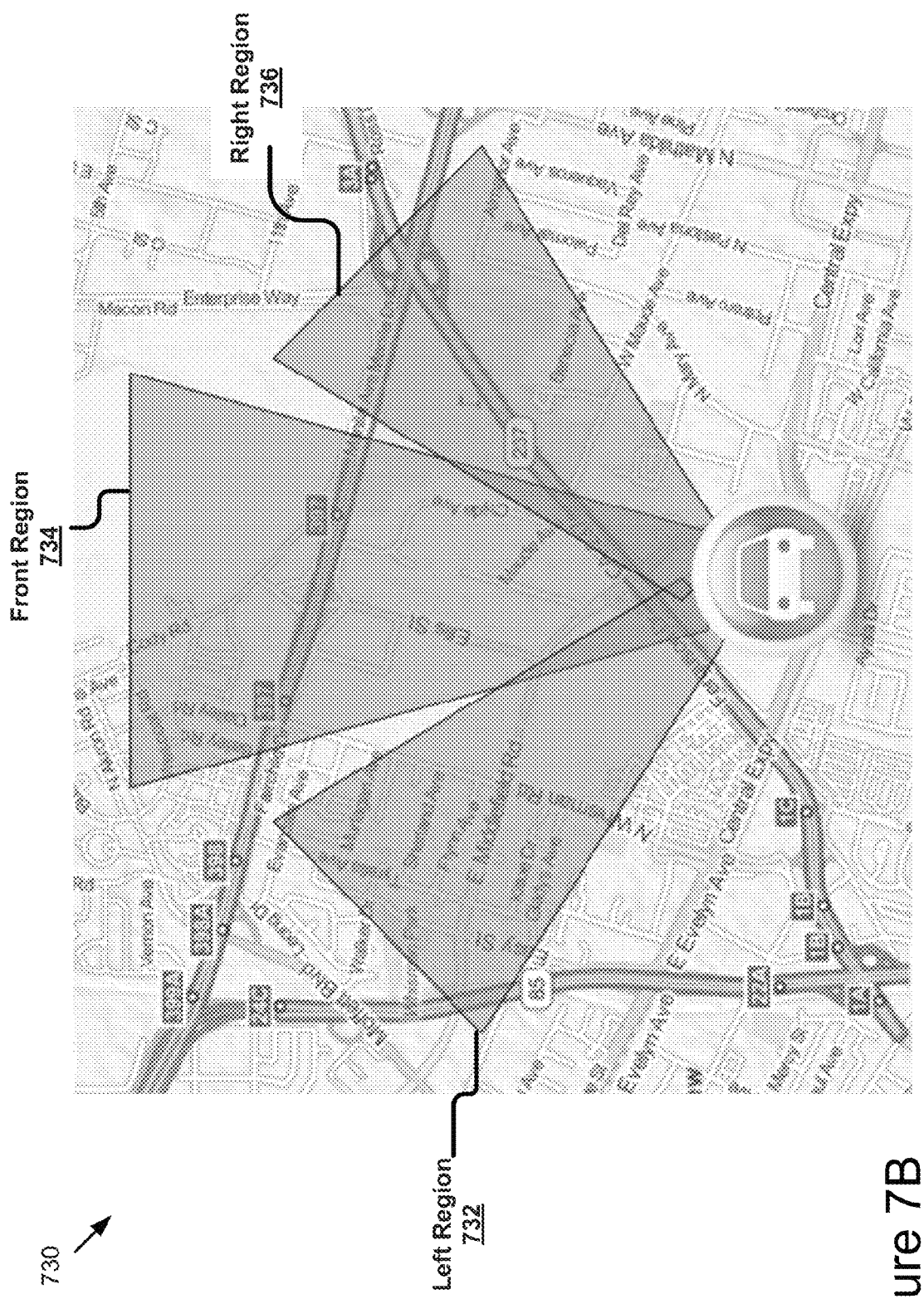
Figure 7C:
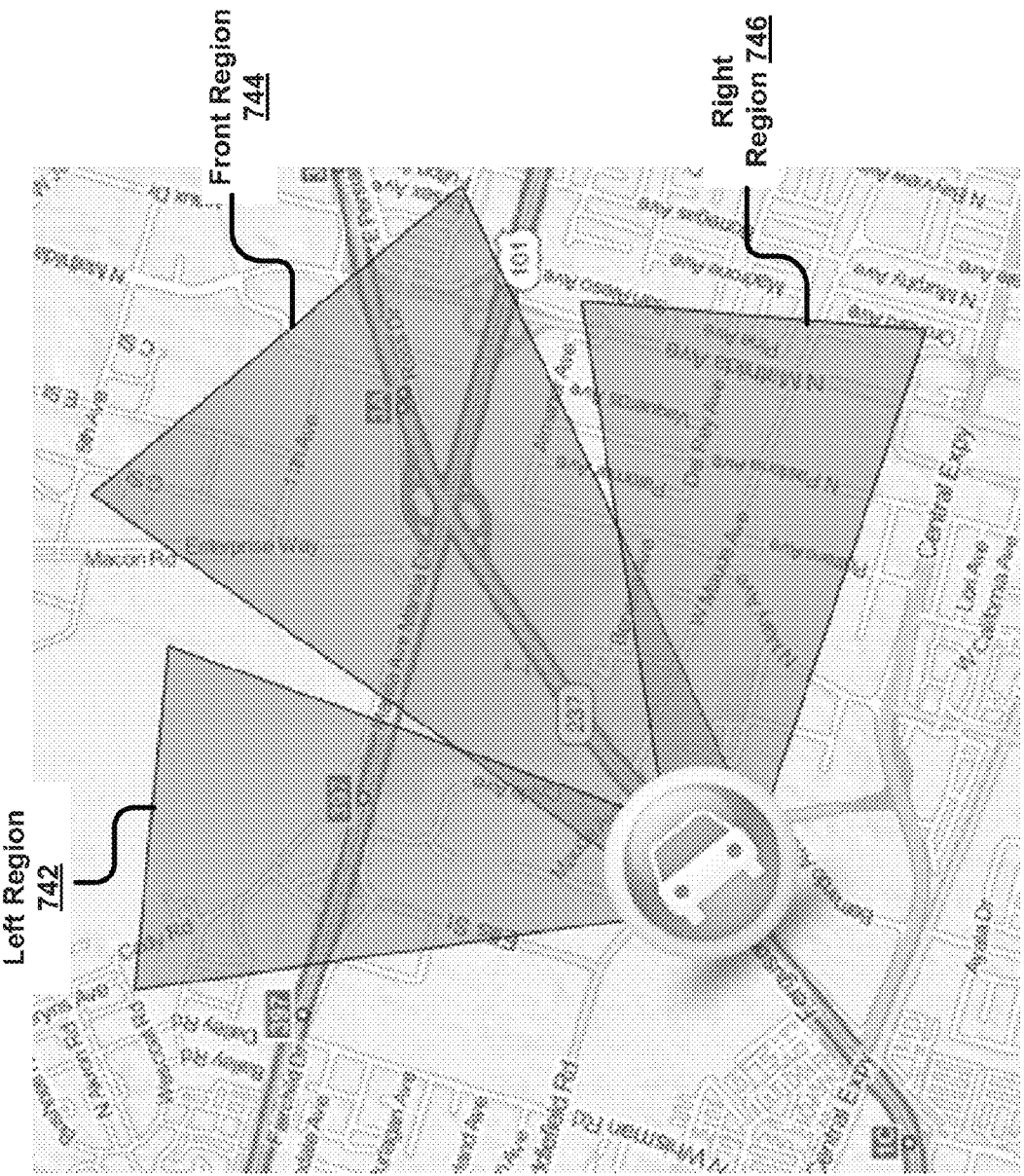
Figure 7D:
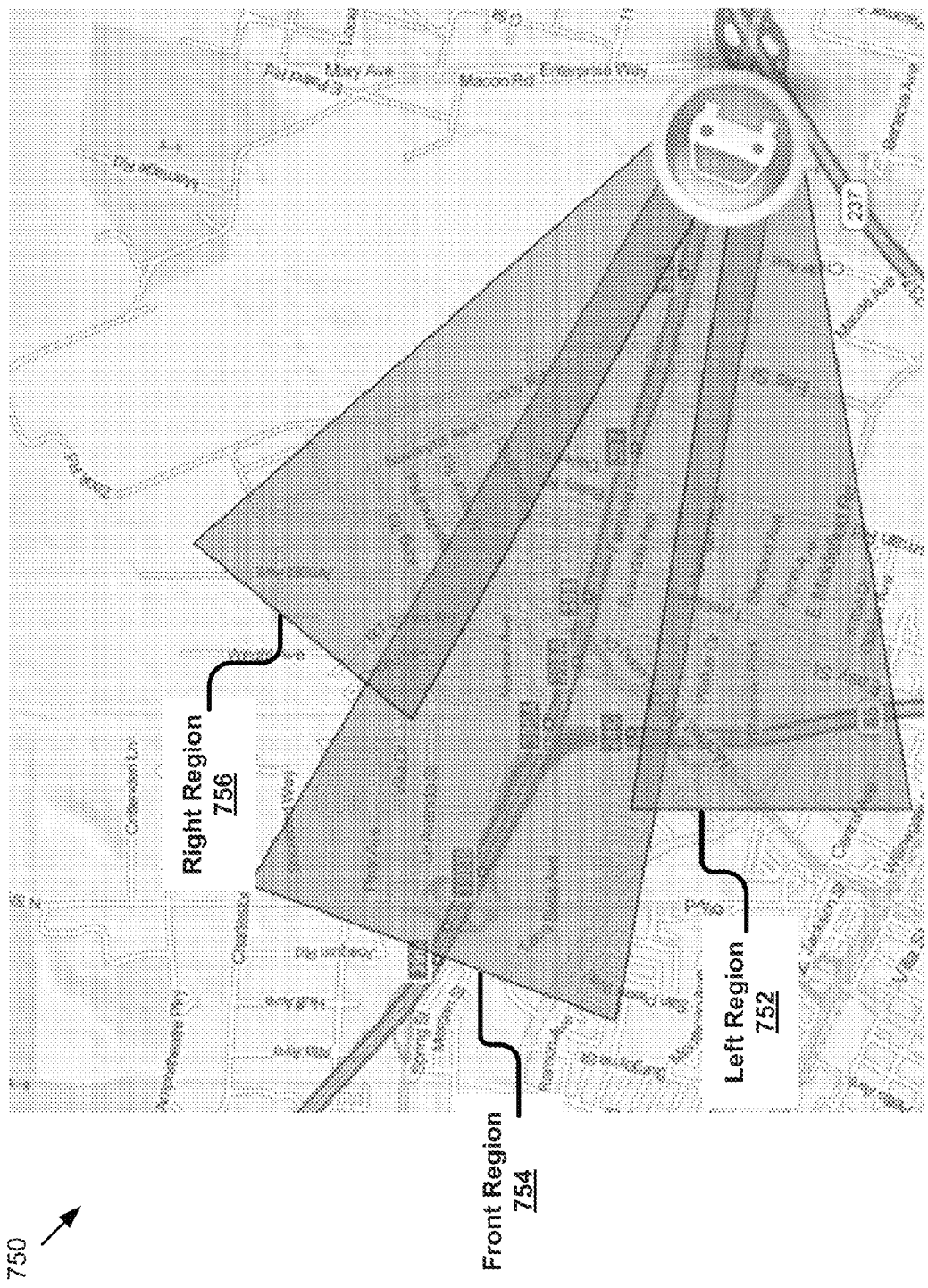
Figure 7E:
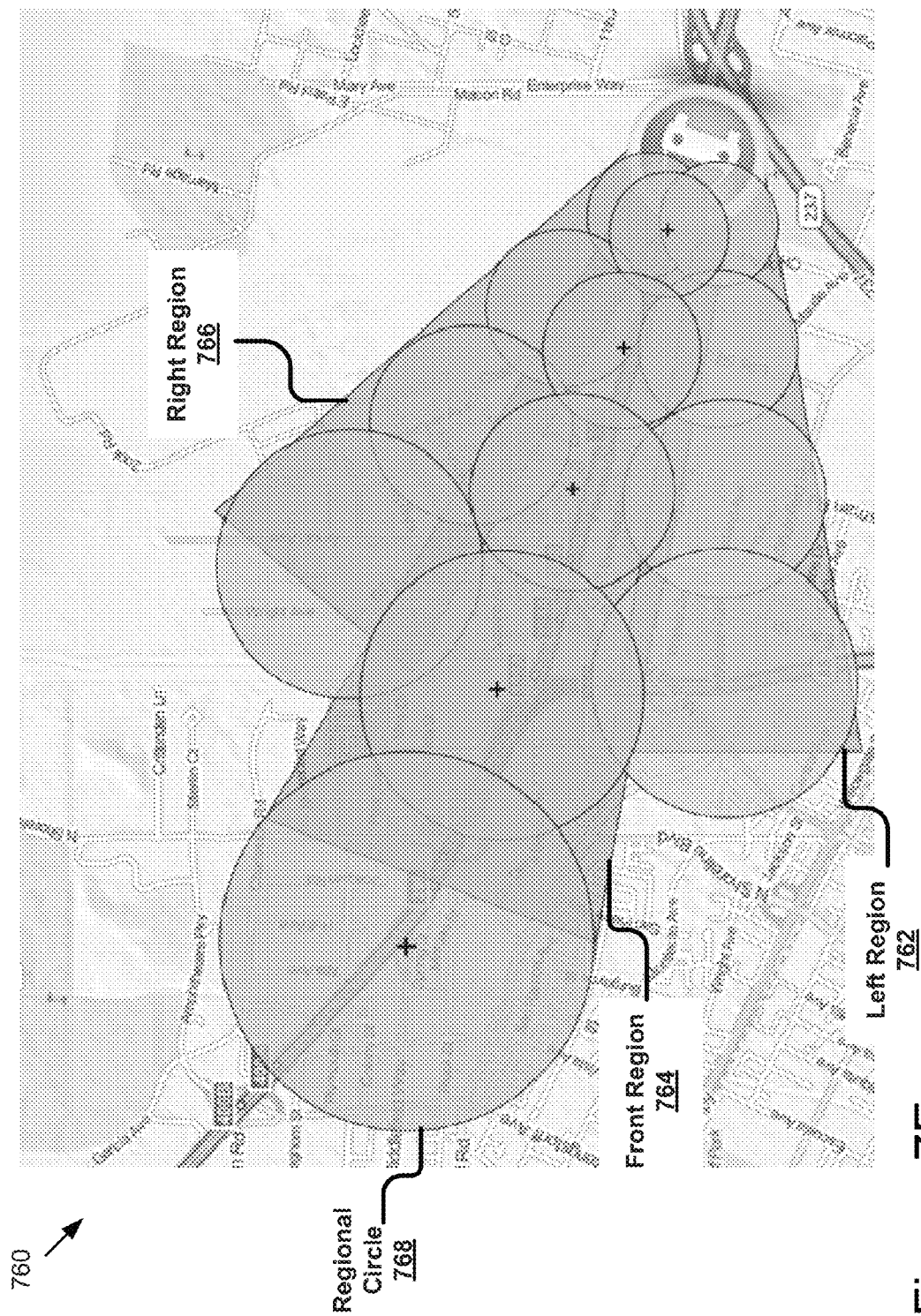
Figure 7F:
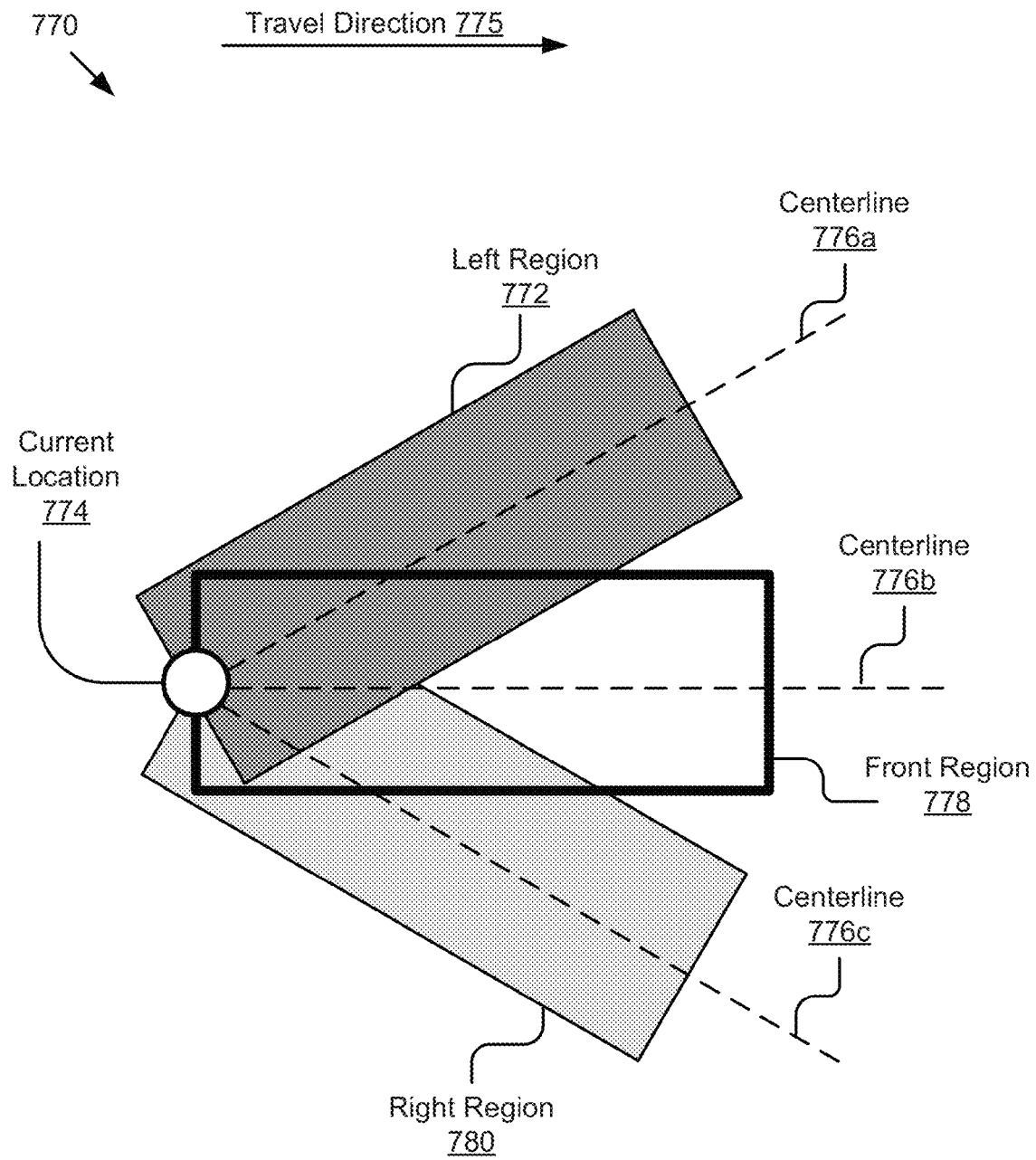

FIGS. 7A-7F are graphic representations 700, 730, 740, 750, 760, 770 illustrating various zones of relevance according to some embodiments. FIG. 7A is described above with reference to FIG. 2, and the description will not be repeated here. FIG. 7B illustrates a left region 732, a front region 734 and a right region 736 of a zone of relevance associated with a user at the start of travel according to one embodiment. FIG. 7C illustrates a left region 742, a front region 744 and a right region 746 of a zone of relevance configured according to a travel direction associated with a user according to one embodiment. FIG. 7D illustrates a left region 752, a front region 754 and a right region 756 of a zone of relevance associated with a user when the user travels on a freeway according to one embodiment. FIG. 7E illustrates a left region 762, a front region 764 and a right region 766 of a zone of relevance associated with a user when the user travels on a freeway according to one embodiment. Each region in FIG. 7E is mapped to multiple regional circles 768.

Referring to FIG. 7E, a zone of relevance with a left region 772, a front region 778 and a right region 780 is illustrated. FIG. 7E also illustrates a current location 774 and a travel direction 775 associated with a user, a centerline 776a for the left region 772, a centerline 776b for the front region 778 and a centerline 776c for the right region 780. The left region 772, the front region 778 and the right region 780 are of rectangular shapes.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    receiving data provided by one or more mobile computing systems configured to determine a current location and a travel speed associated with a user, the data describing the current location and the travel speed associated with the user;
    determining a travel status associated with the user based on the current location and the travel speed, the travel status describing a current state of a journey of the user;
    creating a zone of relevance for the user based on the travel status, the zone of relevance including one or more regions with each region being mapped to one or more regional circles, creating the zone of relevance including determining a regional angle and a regional length for each region based on the travel status, and generating the one or more regions based on the regional angle and the regional length;
    generating one or more queries for the zone of relevance;
    retrieving one or more query results that match the zone of relevance using the one or more queries;
    processing the one or more query results to generate zone information relevant to the user; and
    providing the zone information to the user.

2. The method of claim 1, wherein creating the zone of relevance comprises:
    determining one or more circle centers and one or more radii for the one or more regional circles in each region;
    matching each region to the one or more corresponding regional circles that are determined by the one or more circle centers and the one or more radii; and
    determining the zone of relevance including the one or more regions with each region being mapped to the one or more corresponding regional circles.

3. The method of claim 1, wherein the one or more queries includes one or more circle queries with each circle query corresponding to one of the one or more regional circles in each region.

4. The method of claim 1, wherein processing the one or more query results comprises:
    filtering the one or more query results to remove duplicate data;
    filtering the one or more query results to remove data related to a direction opposite to a travel direction associated with the user; and
    combining the one or more filtered query results to generate the zone information relevant to the user.

5. The method of claim 1, further comprising:
    receiving data describing a travel direction associated with the user;
    receiving data describing a local map associated with the current location;
    matching the current location to the local map to determine a road type; and
    wherein the travel status is further determined based on the road type and the travel direction.

6. The method of claim 1, wherein the zone of relevance is configured based on at least one of a travel direction and a road type.

7. The method of claim 1, wherein the one or more regions include a front region, a left region and a right region.

8. A computer program product comprising a non-transitory computer usable medium including a computer readable program, wherein the computer readable program when executed on a computer causes the computer to:
    receive data provided by one or more mobile computing systems configured to determine a current location and a travel speed associated with a user, the data describing the current location and the travel speed associated with the user;
    determine a travel status associated with the user based on the current location and the travel speed, the travel status describing a current state of a journey of the user;
    create a zone of relevance for the user based on the travel status, the zone of relevance including one or more regions with each region being mapped to one or more regional circles, and to create the zone of relevance including determining a regional angle and a regional length for each region based on the travel status, and generating the one or more regions based on the regional angle and the regional length;
    generate one or more queries for the zone of relevance;
    retrieve one or more query results that match the zone of relevance using the one or more queries;
    process the one or more query results to generate zone information relevant to the user; and
    provide the zone information to the user.

9. The computer program product of claim 8, wherein creating the zone of relevance comprises:
    determining one or more circle centers and one or more radii for the one or more regional circles in each region;
    matching each region to the one or more corresponding regional circles that are determined by the one or more circle centers and the one or more radii; and
    determining the zone of relevance including the one or more regions with each region being mapped to the one or more corresponding regional circles.

10. The computer program product of claim 8, wherein the one or more queries includes one or more circle queries with each circle query corresponding to one of the one or more regional circles in each region.

11. The computer program product of claim 8, wherein processing the one or more query results comprises:
    filtering the one or more query results to remove duplicate data;
    filtering the one or more query results to remove data related to a direction opposite to a travel direction associated with the user; and
    combining the one or more filtered query results to generate the zone information relevant to the user.

12. The computer program product of claim 8, wherein the computer readable program when executed on the computer causes the computer to also:
    receive data describing a travel direction associated with the user;

receive data describing a local map associated with the current location;

match the current location to the local map to determine a road type; and wherein the travel status is further determined based on the road type and the travel direction.

13. The computer program product of claim 8, wherein the zone of relevance is configured based on at least one of a travel direction and a road type.

14. A system comprising:

a processor; and a memory storing instructions that, when executed, cause the system to:

receive data provided by one or more mobile computing systems configured to determine a current location and a travel speed associated with a user, the data describing the current location and the travel speed associated with the user;

determine a travel status associated with the user based on the current location and the travel speed, the travel status describing a current state of a journey of the user;

create a zone of relevance for the user based on the travel status, the zone of relevance including one or more regions with each region being mapped to one or more regional circles, and to create the zone of relevance including determining a regional angle and a regional length for each region based on the travel status, and generating the one or more regions based on the regional angle and the regional length;

generate one or more queries for the zone of relevance;

retrieve one or more query results that match the zone of relevance using the one or more queries;

process the one or more query results to generate zone information relevant to the user; and provide the zone information to the user.

15. The system of claim 14, wherein the instructions when executed cause the system to create the zone of relevance by:

determining one or more circle centers and one or more radii for the one or more regional circles in each region;

matching each region to the one or more corresponding regional circles that are determined by the one or more circle centers and the one or more radii; and determining the zone of relevance including the one or more regions with each region being mapped to the one or more corresponding regional circles.

16. The system of claim 14, wherein the instructions when executed cause the system to process the one or more query results by:

filtering the one or more query results to remove duplicate data;

filtering the one or more query results to remove data related to a direction opposite to a travel direction associated with the user; and combining the one or more filtered query results to generate the zone information relevant to the user.

17. The system of claim 14, wherein the instructions when executed cause the system to also:

receive data describing a travel direction associated with the user;

receive data describing a local map associated with the current location;

match the current location to the local map to determine a road type; and wherein the travel status is further determined based on the road type and the travel direction.

* * * * *